Oct. 7, 1924.
C. W. BECK
1,510,881
STEERING WHEEL RIM
Original Filed Oct. 26, 1914     2 Sheets-Sheet 1
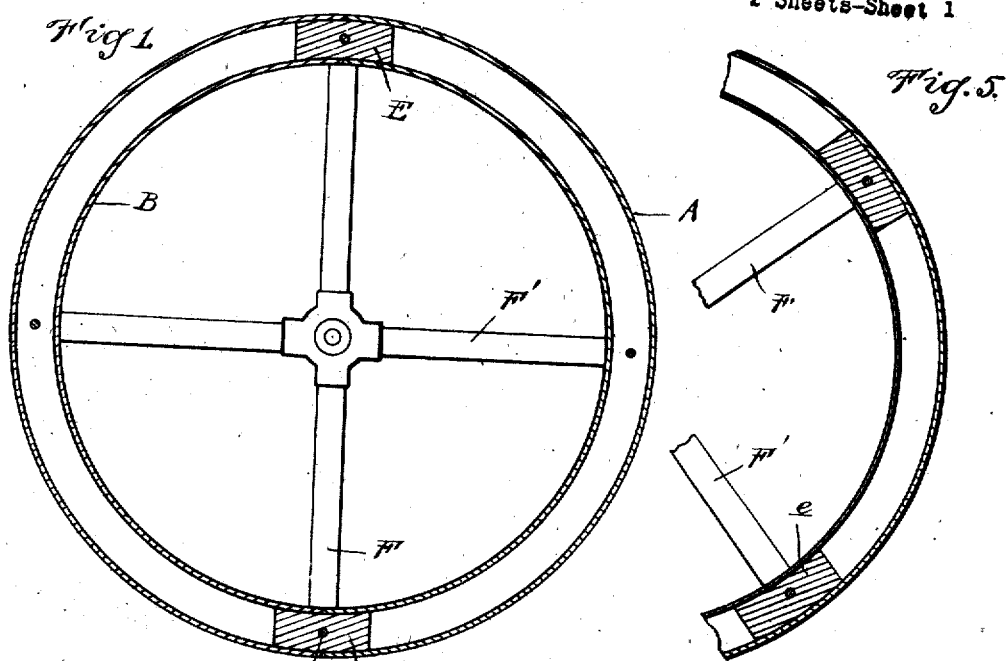
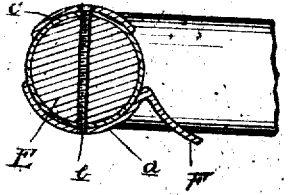
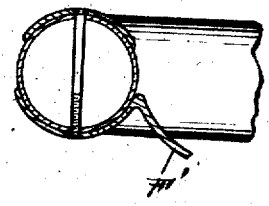
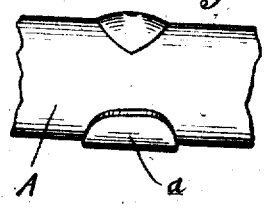
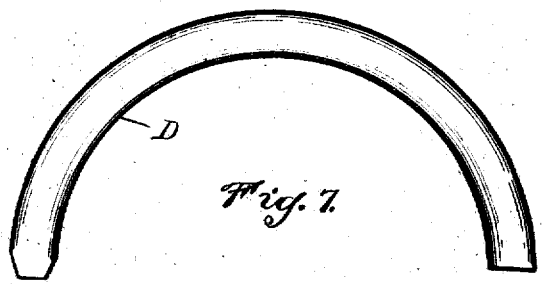
Inventor
Charles W. Beck.

Oct. 7, 1924.

C. W. BECK 1,510,881

STEERING WHEEL RIM

Original Filed Oct. 26, 1914  2 Sheets-Sheet 2

Inventor
Charles W. Beck

Patented Oct. 7, 1924.

1,510,881

UNITED STATES PATENT OFFICE.

CHARLES W. BECK, OF DETROIT, MICHIGAN, ASSIGNOR TO THE BECK-FROST CORPORATION, OF DETROIT, MICHIGAN, A CORPORATION OF MICHIGAN.

STEERING-WHEEL RIM.

Original application filed October 26, 1914, Serial No. 868,723. Divided and this application filed April 12, 1918, Serial No. 228,157. Renewed May 12, 1924.

*To all whom it may concern:*

Be it known that I, CHARLES W. BECK, a citizen of the United States of America, residing at Detroit, in the county of Wayne and State of Michigan, have invented certain new and useful Improvements in Steering-Wheel Rims, of which the following is a specification, reference being had therein to the accompanying drawings.

The invention relates to a new and improved steering wheel rim and has for its object the provision of a rim formed of vulcanized fibrous material.

Prior to my invention steering wheel rims were commonly formed of wood or metal but I have found that a steering wheel formed of vulcanized fibrous material not only possesses the efficiency of the wooden or metal steering wheel rim but has additional qualities that make it much more desirable. Thus the rim formed of vulcanized fibrous material is cheap to manufacture, is a great deal lighter than wood or metal, and as its walls are comparatively thin and are a poor conductor, it is a much more desirable rim in cold weather than rims formed of wood or metal, for a wood or metal rim keeps the hands of the driver cold. Although my improved rim is light, it nevertheless has sufficient rigidity to retain its shape and the toughness of the fibrous material makes it strong enough to withstand any stresses placed upon it. The vulcanized fibrous material may be highly finished giving it the neat appearance of the more expensive rim. I have found that other composite materials are heavy and are affected by the heat or cold while a rim formed of fibrous material is not affected either by the extreme heat or by the extreme cold to which a steering wheel rim is subjected in use.

The rim is formed of vulcanized fibrous material by the method as described and claimed in my original application, Serial No. 868,723, filed October 26, 1914, for "Method of forming rims for steering wheels," the present application being a division thereof.

In the drawings:

Figure 1 is a horizontal section of a rim to which my invention is applied;

Figure 2 is a similar view of a modified construction;

Figures 3, 4 and 5 illustrate certain details;

Figure 6 is a section through a tube after it has been shaped;

Figure 7 illustrates a curved mandrel;

Figure 8:
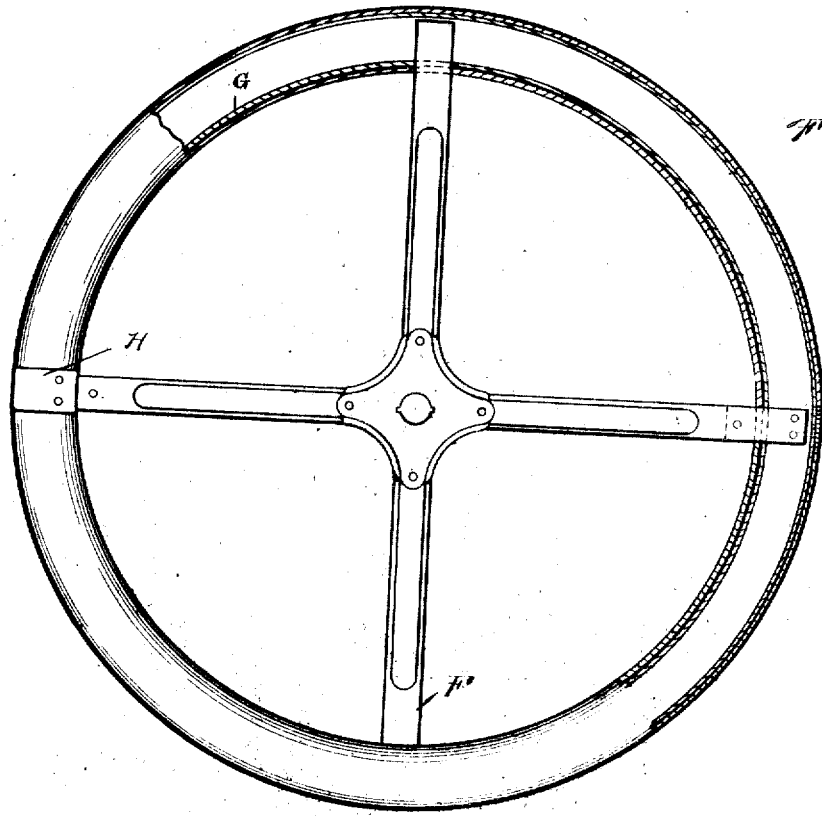
Figure 8 is a top plan view partly in section of a modification.

In making my improved steering wheel rim, a tube is formed of fibrous material, preferably by winding fibrous material upon a suitable mandrel and vulcanizing, and while the fibrous material is still green it is bent into the desired form and then allowed to dry sufficiently to retain its shape. Preferably the fibrous material is wound upon a straight mandrel, thereby forming a straight tube. The latter is then removed from the mandrel while the fibers are still green, the chemical solution washed from the fibrous material and the tube then telescoped upon a mandrel of segmental form, the curvature of the mandrel being substantially that desired for the vehicle wheel rim. The fibrous tube is preferably allowed to remain upon the curved mandrel until sufficiently dry to maintain its shape, and is then removed. After the green tube is telescoped upon the curved mandrel, any creases or the like may be eliminated by ironing, or by any other suitable process.

Instead of shaping the green tube by forcing it over a curved mandrel, the green tube may be subjected to molds shaped by hand, or otherwise suitably formed. Also when an inner rim member is employed the fibrous tube when removed from the straight mandrel, is telescoped upon the inner rim member and allowed to shrink thereupon to form a permanent covering therefor. During setting or hardening of the vulcanized fiber there is a tendency for it to contract. I therefore find it desirable to form the rim of a plurality of segments, the ends of the segments being connected together in any suitable manner. In some instances, however, the rim may be formed of a split ring.

In the drawings, Figure 1 illustrates a rim made of two segments A and B, each formed solely of fibrous material by forcing a green straight tube as C in Figure 6 over a curved mandrel D as shown in Figure 7. The meeting ends of the sections A and B are connected together by means of a filler member E formed of wood or other suitable material and to which the ends of the spider arms F are attached. The filler block is preferably glued and nailed to the meeting ends of the segments, but may be attached thereto in any desirable manner. The outer ends of the arms are shaped to form segmental bearings $a$ to receive the rim. Preferably two of the arms are connected to the rim at the junction of the segments, as by means of screws $b$ which pass through the rim and through the blocks E. If desired, a segmental bearing $c$ may be employed for the upper face of the rim. In some instances, instead of securing the ends of the intermediate arms F' to the rim, as shown in Figures 1 and 4, a filler member $e$ is arranged intermediate the ends of the segments to form a more rigid attachment for the outer end of the spider arms F'. The member $e$ is of sufficient size to allow it to be telescoped within the segmental tube after the latter has dried.

In the construction shown in Figure 8, an inner rim G of tubular metal is provided, this metal tube serving to shape the green tube when the latter is applied thereto as hereinbefore described. With the arrangement shown in Figure 8, the ends of the tubular metal sections may be connected together by a metallic band H.

Figure 9:
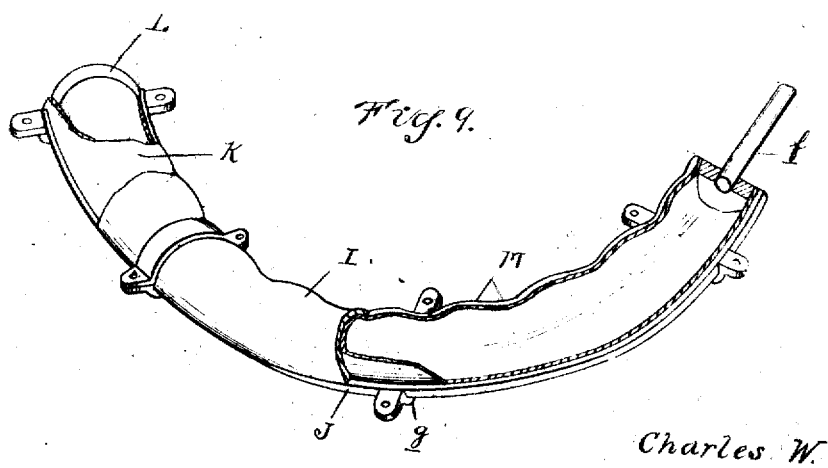
Figure 9 is a sectional perspective view illustrating a mold in which the rim may be formed.

Instead of shaping the fibrous material upon a mandrel, it may—as before stated—be shaped in a mold and in Figure 9 I have illustrated one manner of forming the fibrous material by means of a mold. Thus I and J are two sections of a sheet metal mold, of segmental form, and K is the fibrous material. The latter is made into tubular form and one end thereof closed by means of a stopper L or other suitable means, while the opposite end is attached to the compressed air supply connection $f$. After the fibrous tube has been engaged with the mold and the sections thereof clamped closed, as by means of a clamp $g$, compressed air is admitted to the fibrous tube, which will cause the latter to assume the shape of the mold. The mold is herein shown as having a plurality of corrugations M on the inner face thereof and of a contour to form a section of a steering wheel rim. After the fibers of the material have set or hardened sufficiently to retain its shape, the material is removed from the mold.

From the above description it is seen that several very desirable forms of rims may be made of vulcanized fibrous material. These rims are durable and can be cheaply manufactured; they are of light weight, and the exterior of the rims can be readily finished to present a neat and pleasing appearance. Also they are a decided improvement over rims formed of metal or wood inasmuch as the metal or wood rims are good conductors and consequently in cold weather the rims act to keep the hands of the operator cold.

What I claim as my invention, is:

1. As a new article of manufacture, a steering wheel rim formed of vulcanized fibrous material, said rim being hollow and formed in segments, and filler blocks insertable within the meeting ends of the segments coacting to secure the same.

2. In a steering gear wheel, the combination of a rim having a plurality of hollow sections, filler blocks connecting the respective meeting ends of said sections, a spider having certain of its arms located at the meeting ends of said sections, and means respectively passing through the sections, filler blocks and arms for securing the parts together.

3. As a new article of manufacture, a steering wheel rim formed of a plurality of hollow sections, filler blocks insertable within the meeting ends of the sections co-acting to secure the same, and a spider having certain of its arms located at the meeting ends of said sections and secured to said filler blocks.

4. As a new article of manufacture, a steering wheel rim formed of a plurality of hollow sections, filler blocks connecting the respective meeting ends of said sections, and means for securing said filler blocks to said sections.

5. As a new article of manufacture, a steering wheel rim formed of a plurality of hollow sections, solid members closing the hollow sections, and adjacent ends of the hollow sections, and spider arms secured to said solid members.

In testimony whereof I affix my signature.

CHARLES W. BECK.